US012649424B2

(12) United States Patent
Fox-Rabinovitz

(10) Patent No.: US 12,649,424 B2
(45) Date of Patent: Jun. 9, 2026

(54) ENVIRONMENTAL PROTECTION SLEEVE FOR VEHICLE SENSORS

(71) Applicant: Torc Robotics, Inc., Blacksburg, VA (US)

(72) Inventor: Joseph R. Fox-Rabinovitz, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 306 days.

(21) Appl. No.: 18/410,334

(22) Filed: Jan. 11, 2024

(65) Prior Publication Data

US 2025/0229726 A1 Jul. 17, 2025

(51) Int. Cl.
*B60R 11/00* (2006.01)
*B60S 1/54* (2006.01)

(52) U.S. Cl.
CPC ......... *B60R 11/00* (2013.01); *B60R 2011/004* (2013.01); *B60R 2011/0094* (2013.01)

(58) Field of Classification Search
CPC . B60R 2011/04; B60R 2011/94; B60R 11/00; B60S 1/54
USPC ........................................................ 269/1.07
See application file for complete search history.

(56) References Cited

U.S. PATENT DOCUMENTS

| | | | | |
|---|---|---|---|---|
| 3,400,637 A | * | 9/1968 | Roberts, Jr. ............. | F15B 15/10 |
| | | | | 92/100 |
| 6,401,351 B1 | * | 6/2002 | Pinkos ................. | B60N 2/0031 |
| | | | | 33/755 |
| 10,011,230 B1 | * | 7/2018 | Brown ................. | H04N 23/698 |
| 11,014,503 B2 | * | 5/2021 | O'Connor .............. | B65D 43/14 |
| 12,196,864 B1 | * | 1/2025 | Lacaze ................... | G01K 3/005 |
| 12,528,424 B2 | * | 1/2026 | LaCross ................. | B60R 11/04 |
| 2006/0155443 A1 | * | 7/2006 | Hoffman .............. | E01C 11/265 |
| | | | | 701/45 |
| 2007/0040412 A1 | * | 2/2007 | Buley .................... | B62D 35/00 |
| | | | | 296/180.1 |
| 2007/0091474 A1 | | 4/2007 | Hubbard | |
| 2011/0149077 A1 | * | 6/2011 | Robert ...................... | B60R 1/12 |
| | | | | 348/148 |
| 2014/0085467 A1 | * | 3/2014 | Barthel ................... | B60R 11/04 |
| | | | | 348/148 |
| 2017/0129393 A1 | * | 5/2017 | Johnson ................. | F21S 41/43 |
| 2019/0330870 A1 | * | 10/2019 | May .......................... | E04H 6/04 |

(Continued)

*Primary Examiner* — Kambiz Abdi
(74) *Attorney, Agent, or Firm* — Armstrong Teasdale LLP

(57) ABSTRACT

The disclosure relates to a protective sleeve for selectively providing a barrier between an undesirable environmental condition and a sensing device. The protective sleeve includes a sleeve body that is movable between a stowed orientation and a deployed orientation. In the deployed orientation the sleeve body produces a barrier between the environmental conditions and the sensing device. The sleeve body is movable between the stowed and deployed orientations by an actuator. The protective sleeve includes a processing system including a sensor for sensing the environmental conditions. The processing system controller and processor programmed to selectively power the actuator when an undesirable environmental condition is sensed by the sensor to move the sleeve body to the deployed orientation, and also selectively power the actuator to cause the actuator to move the sleeve body to the stowed orientation in the absence of an undesirable environmental condition.

20 Claims, 9 Drawing Sheets

(56)         References Cited

U.S. PATENT DOCUMENTS

| | | | |
|---|---|---|---|
| 2020/0398765 A1* | 12/2020 | Krishnan | B60R 11/04 |
| 2021/0260972 A1* | 8/2021 | Zeng | B60J 3/002 |
| 2021/0394596 A1* | 12/2021 | Jocz | B60J 7/0573 |
| 2022/0410816 A1* | 12/2022 | Langlais | B62D 25/06 |
| 2023/0001890 A1* | 1/2023 | Davidson | G01S 17/931 |
| 2023/0011832 A1* | 1/2023 | Hodge | B60R 1/26 |
| 2023/0017706 A1 | 1/2023 | Carter | |
| 2023/0123315 A1* | 4/2023 | Huelsen | B60R 11/04 |
| | | | 340/937 |
| 2023/0146876 A1* | 5/2023 | Sviberg | G01S 13/931 |
| | | | 224/567 |
| 2023/0202680 A1* | 6/2023 | Yehya | B64U 70/30 |
| | | | 244/110 E |
| 2025/0224072 A1* | 7/2025 | Barbo | F16M 11/126 |
| 2025/0229630 A1* | 7/2025 | Kangutkar | B60K 35/223 |
| 2025/0319847 A1* | 10/2025 | Stein | B60S 1/56 |
| 2025/0383584 A1* | 12/2025 | Robertson | G03B 11/045 |
| 2026/0008418 A1* | 1/2026 | Ikeno | B60R 11/02 |

* cited by examiner

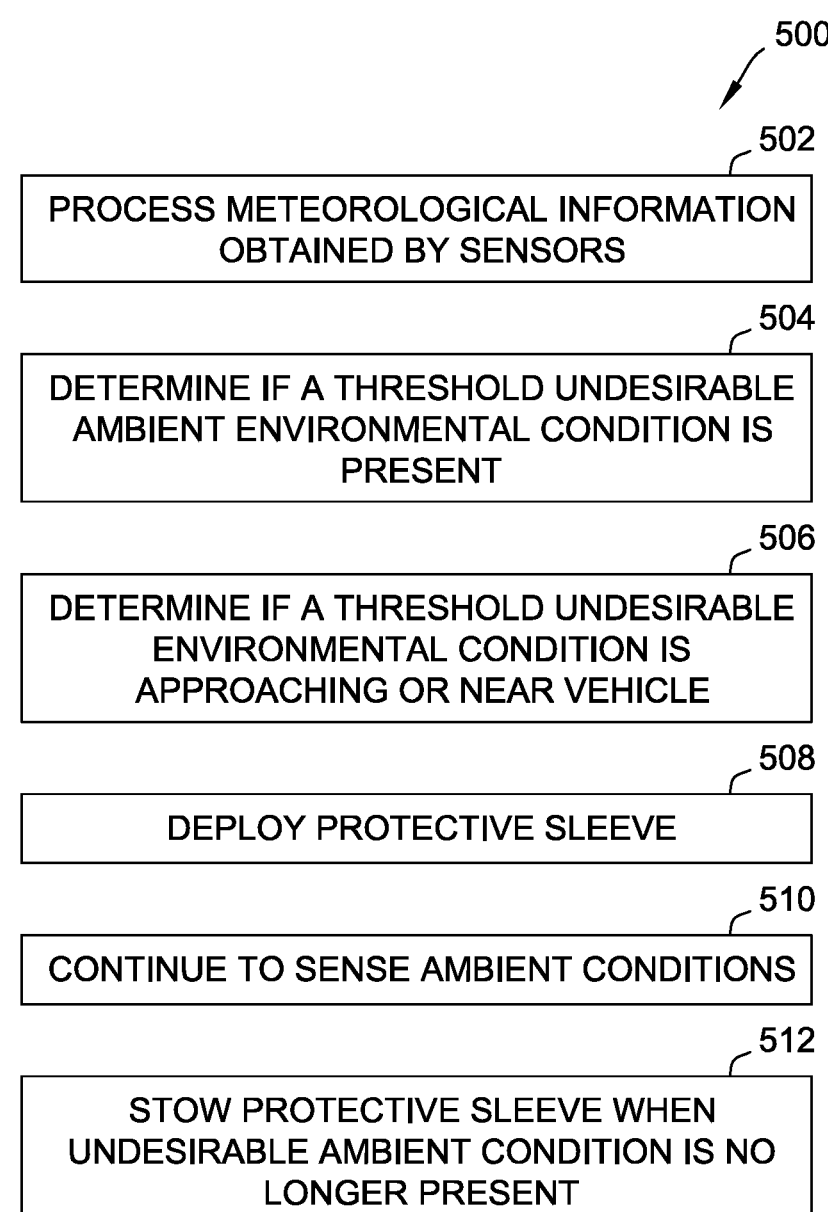

500

502

PROCESS METEOROLOGICAL INFORMATION OBTAINED BY SENSORS

504

DETERMINE IF A THRESHOLD UNDESIRABLE AMBIENT ENVIRONMENTAL CONDITION IS PRESENT

506

DETERMINE IF A THRESHOLD UNDESIRABLE ENVIRONMENTAL CONDITION IS APPROACHING OR NEAR VEHICLE

508

DEPLOY PROTECTIVE SLEEVE

510

CONTINUE TO SENSE AMBIENT CONDITIONS

512

STOW PROTECTIVE SLEEVE WHEN UNDESIRABLE AMBIENT CONDITION IS NO LONGER PRESENT

FIG. 5

ENVIRONMENTAL PROTECTION SLEEVE FOR VEHICLE SENSORS

TECHNICAL FIELD

The field of the disclosure relates generally to smart vehicles, and more particularly, to smart vehicles that include a deployable sleeve to protect externally mounted sensing devices used by the autonomous vehicle.

BACKGROUND

Vehicles, such as autonomous vehicles include externally mounted devices such as sensors, cameras and the like (collectively "sensing devices") that generally provide environmental perception, and the environmental perception activity yields information relating to the area surrounding the vehicle. Environmental perception typically includes object detection and understanding and may be based at least in part on data collected by acoustic sensors, image data collected, for example, by Light Detection and Ranging sensors (LiDAR), Radio Detection and Ranging (RADAR), Sound Navigation and Ranging (SONAR), ultrasonic, or cameras, among other suitable active or passive sensors. The information associated with the area surrounding the vehicle may provide an understanding of the direction and speed associated with the vehicle supporting the environmental perception equipment. Additionally, information relating to the area surrounding the vehicle may comprise information capturing the motion of other vehicles in the area surrounding the vehicle and objects along the road. It is critical to the effective operation of autonomous vehicles that the sensing devices are working properly at all times in order to effectively collect data for use by the autonomous vehicle.

Sensing devices are mounted along the exterior of the vehicle body to collect the required information. As a result, the sensing devices are exposed to environmental conditions, such as ambient weather conditions that could negatively impact the ability of the sensing devices to effectively obtain data and information critical to the operation of the autonomous vehicle. Exemplary environmental conditions that may negatively impact functionality of the sensing devices of current autonomous vehicles include rain, snow, hail and direct sunlight.

Therefore, as discussed in more detail below, it would be advantageous to have a means for selectively providing protection to the sensing devices when the autonomous vehicle is operating in ambient environmental conditions that could negatively impact the operability of the sensing devices.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, an autonomous vehicle comprises: a sensing device connected to the cab; a protective sleeve located along the periphery of the of the sensing device, the protective sleeve being movable between a stowed orientation and a deployed orientation where the sleeve surrounds the sensing device, the protective sleeve being movable between the stowed and deployed orientations by an actuator, the autonomous vehicle further comprising a processing system including a sensor for sensing the environmental conditions proximate the autonomous of the vehicle, the processing system programmed to selectively power the actuator when an undesirable environmental condition is sensed by the sensor to move the protective sleeve to the deployed orientation, and also selectively power the actuator to cause the actuator to move the protective sleeve to the stowed orientation in the absence of an undesirable environmental condition.

In another aspect, a protective sleeve is provided. The protective sleeve provides a barrier between an undesirable environmental condition and a sensing device. The protective sleeve comprising: a sleeve body; the sleeve body being movable between a stowed orientation and a deployed orientation, when in the deployed orientation the sleeve providing a barrier between the environmental condition and the sensing device; the sleeve body being movable between the stowed and deployed orientations by an actuator, protective sleeve further comprising a processing system including a sensor for sensing the environmental conditions proximate the sensor, the processing system programmed to selectively power the actuator when an undesirable environmental condition is sensed by the sensor to move the sleeve body to the deployed orientation, and also selectively power the actuator to cause the actuator to move the sleeve body to the stowed orientation in the absence of an undesirable environmental condition.

In yet a further aspect, a method is provided for stowing and deploying a protective sleeve located along the periphery of a sensing device mounted along the cab of an autonomous vehicle, the protective sleeve being deployed and stowed by an actuator selectively powered by a processing system, the processing system including a sensor, the method comprising: processing sensor data and information collected by the sensor, the data and information relating to the environmental conditions proximate the autonomous vehicle; determining if a threshold undesirable environmental condition is present; and if an undesirable environmental condition is present, powering the actuator to cause the protective sleeve to move to the deployed orientation and thereby surround the sensing device.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 5 is an exemplary flow diagram representing the method of deploying and stowing the protective sleeve bodies of the present disclosure.

Figure 1A:
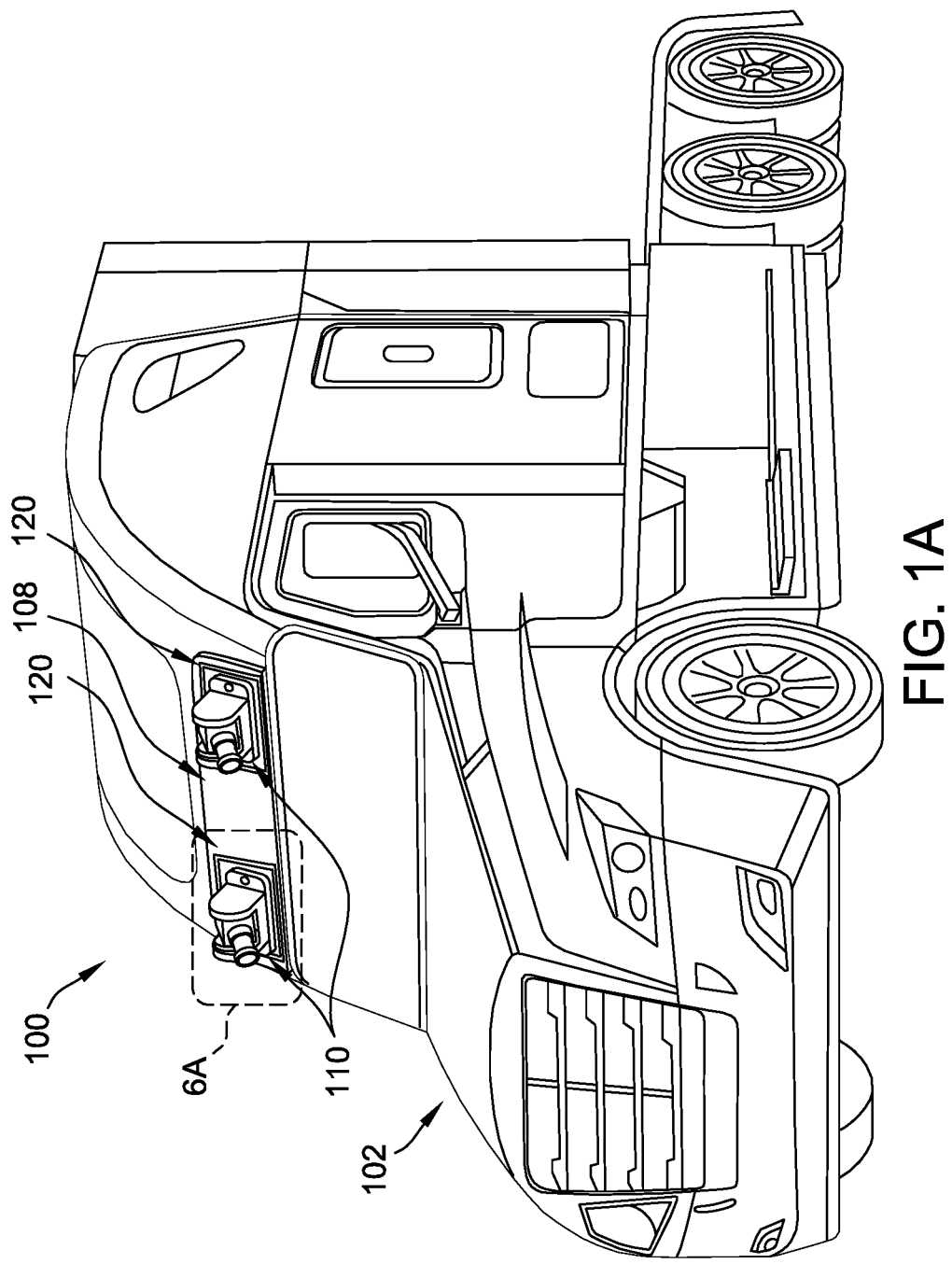
FIG. 1A is a schematic representation of an autonomous vehicle that includes exemplary sensing devices mounted along the exterior of the vehicle with associated protective sleeve bodies stowed.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, or steering wheel positioning, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA. The semi-autonomous vehicle requires a human driver at all times for operating the semi-autonomous vehicle.

A non-autonomous vehicle: A non-autonomous vehicle is a vehicle that is driven by a human driver. A non-autonomous vehicle is neither an autonomous vehicle nor a semi-autonomous vehicle. A non-autonomous vehicle has an autonomy level of level-0 recognized by NHTSA.

A smart vehicle: Any vehicle that utilizes data obtained by sensing devices to operate the vehicle.

An exemplary technical effect associated with the methods, systems, and apparatus described herein includes at least one of: (a) a protective sleeve to serve as a barrier between the sensing devices and undesirable environmental conditions; (b) a protective sleeve that is selectively deployed and stowed; (c) a protective sleeve that is deployed and stowed based on sensed ambient environmental conditions or information provided alerting the autonomous vehicle of approaching undesirable environmental conditions; and (d) a protective sleeve that does not entirely occlude the field of view of the sensor while providing the desired measure of protection to the sensor.

Figure 1B:
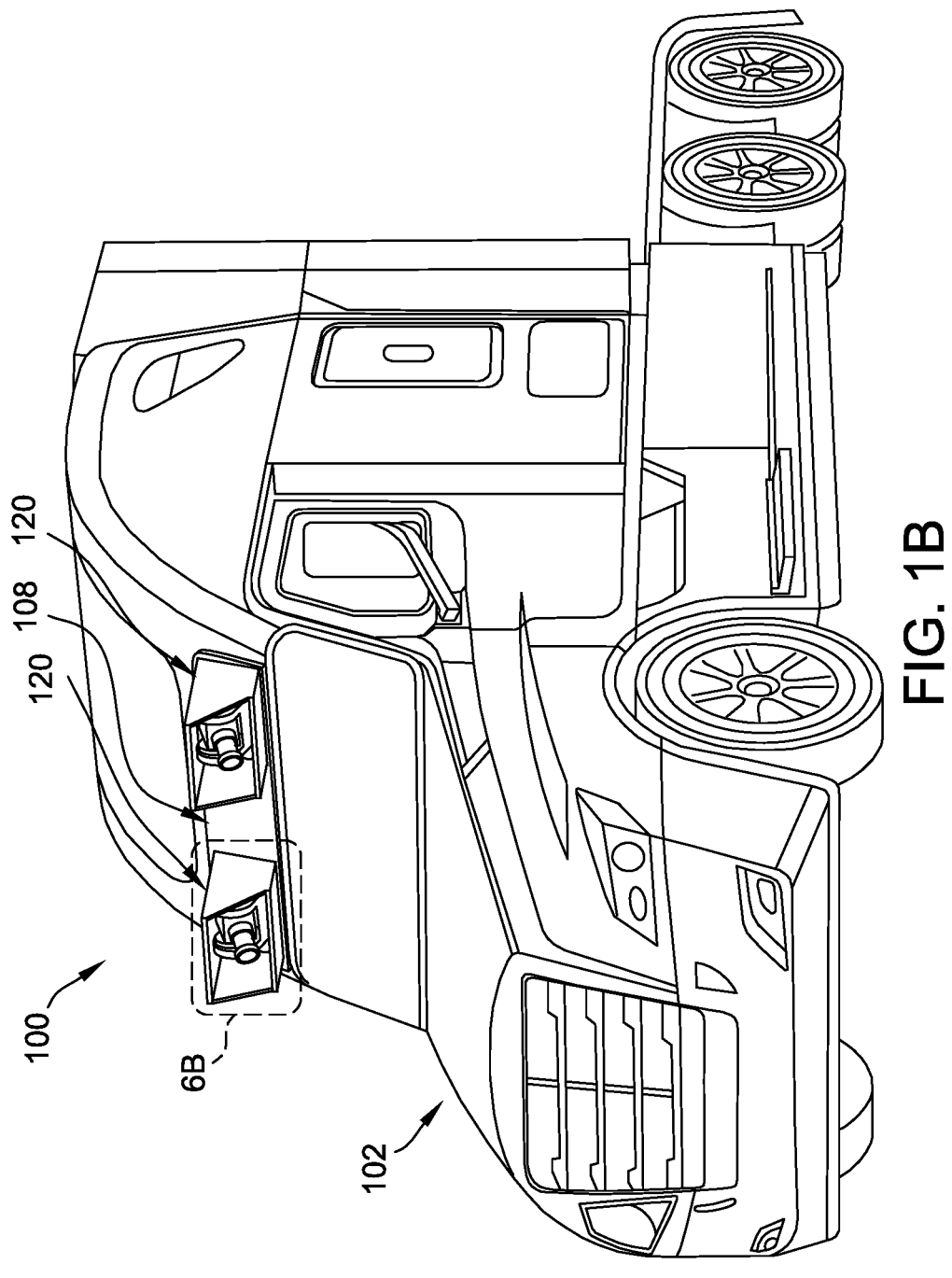
FIG. 1B is the schematic representation of the vehicle of FIG. 1A with the protective sleeve bodies deployed.

FIGS. 1A and 1B schematically represent an autonomous vehicle 100. Vehicle 100 includes a vehicle cab 102. The vehicle may be a smart vehicle that comprises a fully autonomous vehicle, semi-autonomous vehicle or a non-autonomous vehicle equipped with at least one sensor. A sensor bar 108 is fixed to the cab 102. The sensor bar 108 may be a metal bar or other suitable structure that is able to support at least one sensing device 110 for use with vehicle 100. As shown in FIGS. 1A and 1B, the sensing device is a camera however it should be understood that the sensing device may comprise any device used by the autonomous vehicle 100 to collect environmental data used to control the operation of the vehicle 100 which might be adversely affected when impinged on by undesirable environmental conditions. The sensing devices 110 may be directly mounted to the vehicle 100 and in an alternate embodiment the sensor bar may not be used or may be used in combination with sensing devices mounted directly to the vehicle 100. The sensor bar 108 is connected to the cab 102 using conventional fasteners, adhesive substance or other suitable conventional device or method. Alternatively, sensor bar 108 may be made integral with the vehicle at any location along the vehicle. Rather than being fastened to sensor bar 108, the sensing device 110 may be connected or otherwise made integral with the cab 102.

Figure 4A:
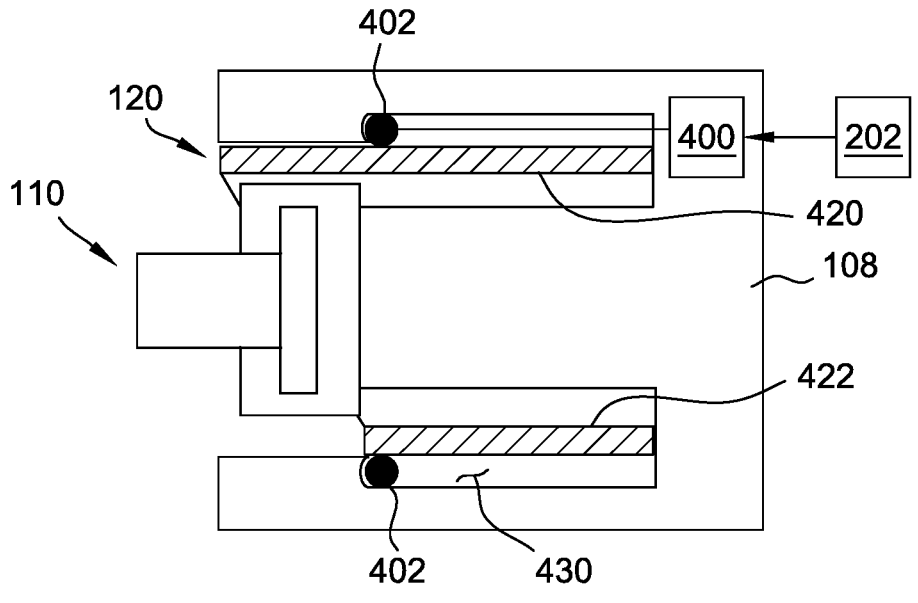
FIG. 4A is a lateral sectional view of the protective sleeve of the vehicle of FIG. 1A showing the protective sleeve body in a stowed orientation.
Figure 4B:
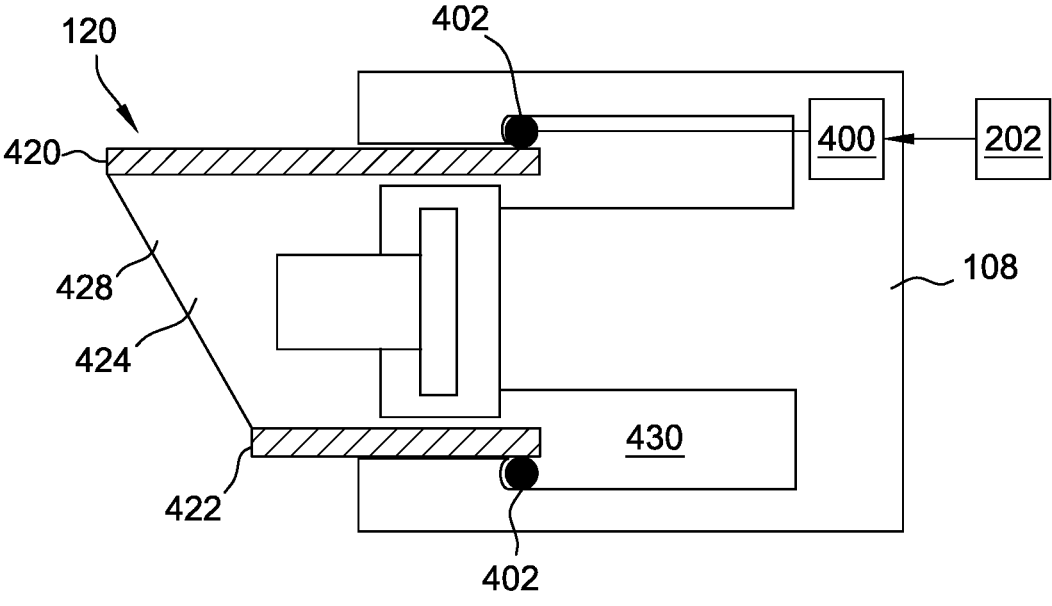
FIG. 4B is a lateral sectional view of the protective sleeve of FIG. 1B showing the protective sleeve body in a deployed orientation.
Figure 6A:
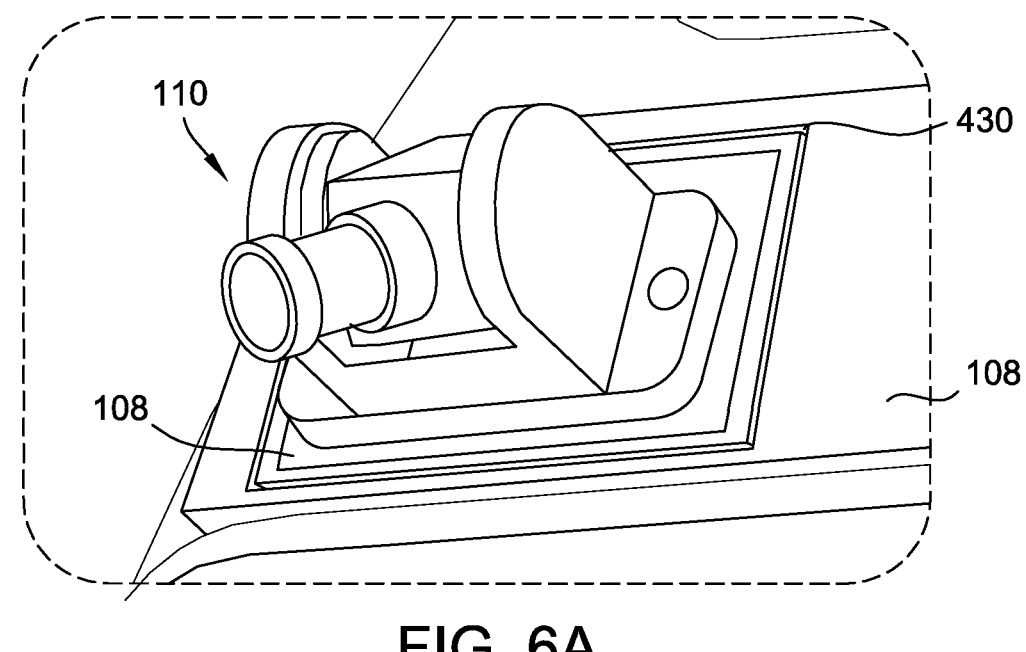
FIG. 6A is an enlarged view of the stowed protective sleeve body in the enclosed area identified as 6A in FIG. 1A.
Figure 6B:
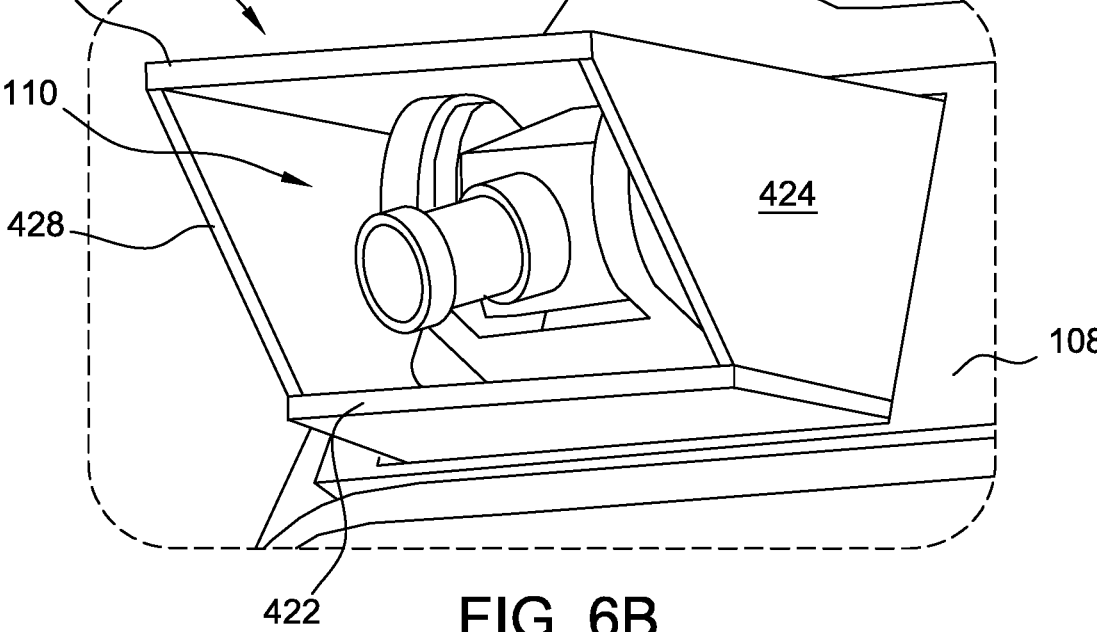
FIG. 6B is an enlarged view of the deployed protective sleeve body in the enclosed area identified as 6B in FIG. 1B.

In FIGS. 1A and 1B, two sensing devices 110 are shown mounted along the sensor bar. Any number of sensing devices may be made integral with the sensor bar 108. Also shown in FIGS. 1A and 1B, a protective sleeve 120 is located along the periphery of each sensing device 110. As shown in FIGS. 1A and 1B of the exemplary embodiment, the protective sleeve 120 comprises a sleeve body that surrounds the base of each sensing device 110. The protective sleeve 120 and associated sensing devices 110 may be implemented at any location around vehicle 100. FIGS. 4A and 4B respectively show sectional views of the protective sleeve in the stowed orientation within sensor bar 108 and in a deployed orientation relative to the sensor bar 108. FIGS. 6A and 6B comprise enlarged views of the protective sleeve 120 shown in FIGS. 1A and 1B respectively.

Figure 2:
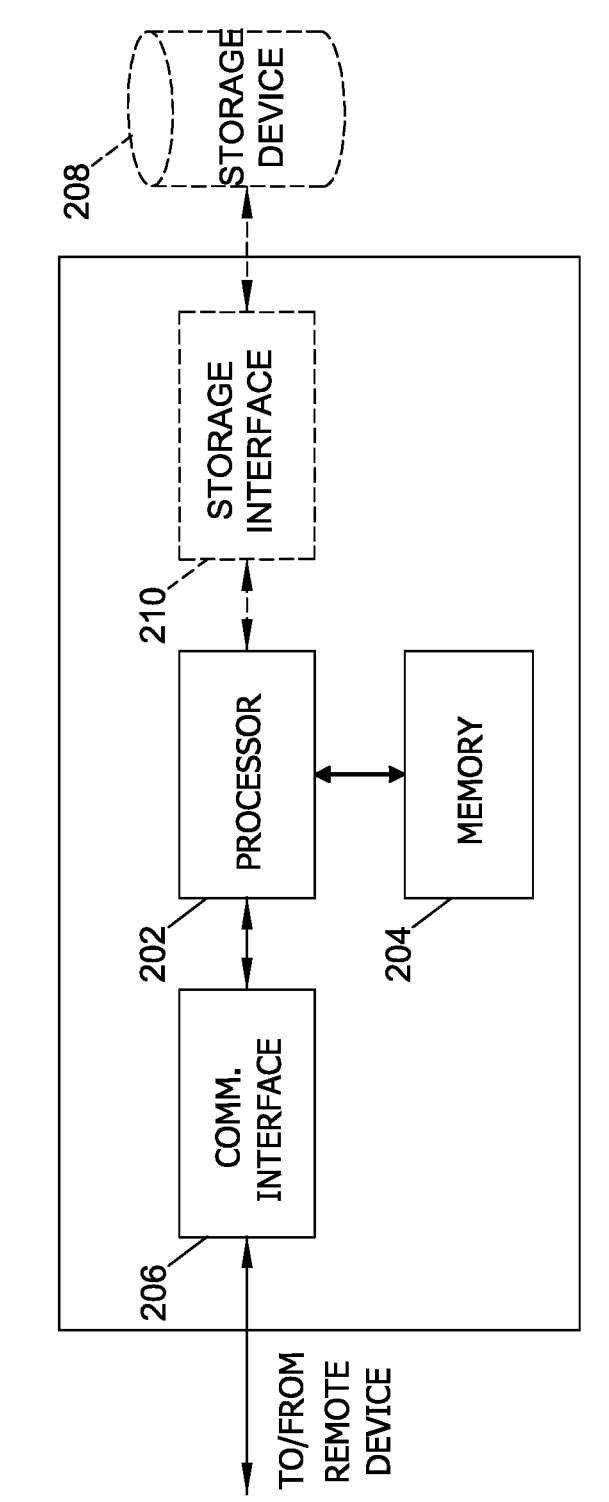
FIG. 2 is an exemplary schematic block diagram of a processing system for implementation of embodiments of the present disclosure.

FIG. 2 is an exemplary schematic block diagram of a processing system 200 for implementation of embodiments of the present disclosure. The processing system 200 may include the system for selectively controlling the deploying and stowing of the protective sleeve 120 as described herein. The processing system 200 may include one or more processing units or processors 202 (E.g.; in a multi-core configuration). Processor 202 may be operatively coupled to a communication interface 206 such that the processing system 200 is capable of communicating with another device, such as a remote application server, a user equipment, a mobile device, a smart vehicle, a mission control or a central hub, or another computing device, for example, using wireless communication or data transmission over one or more radio links or digital communication channels using one or more of a Wi-Fi protocol, an RFID protocol, or a Near-Field Communication (NFC) protocol, as one-way communication or two-way communication.

Processor 202 may also be operatively coupled to a storage device 208. Storage device 208 may be any computer-operated hardware suitable for storing or retrieving data, such as, but not limited to, data associated with historic databases. In some embodiments, storage device 208 may be integrated in the processing system 200. For example, the processing system 200 may include one or more hard disk drives as storage device 208.

In other embodiments, storage device 208 may be external to the processing system 200 and may be accessed by a using a storage interface 210. For example, storage device 208 may include a storage area network (SAN), a network attached storage (NAS) system, multiple storage units such as hard disks or solid-state disks in a redundant array of inexpensive disks (RAID) configuration, or non-volatile memory, such as EEPROM.

In some embodiments, processor 202 may be operatively coupled to storage device 208 via the storage interface 210. Storage interface 210 may be any component capable of providing processor 202 with access to storage device 208. Storage interface 210 may include, for example, an Advanced Technology Attachment (ATA) adapter, a Serial ATA (SATA) adapter, a Small Computer System Interface (SCSI) adapter, a RAID controller, a SAN adapter, a network adapter, or any component providing processor 202 with access to storage device 208.

The processor 202 may execute computer-executable instructions for implementing aspects of the disclosure. In some embodiments, the processor 202 may be transformed into a special purpose microprocessor by executing computer-executable instructions or by otherwise being programmed. In some embodiments, and by way of a non-limiting example, the memory 204 may include instructions to perform specific operations, as described herein.

In certain implementations, the processor 202 may be in communications with one or more motors or other actuators 400 that serve to cause the protective sleeve to deploy or be located in a stowed orientation. Such actuators may comprise an electric motor or a pneumatically or hydraulically powered device. In such a configuration, the processor 202 may initiate deployment of the protective sleeve 102 described herein. For instance, the processor 202 may sense an undesirable ambient weather condition and communicate a signal to the motor 400 to cause the rollers 402 to rotate and extend the protective sleeve 120.

Figure 3:
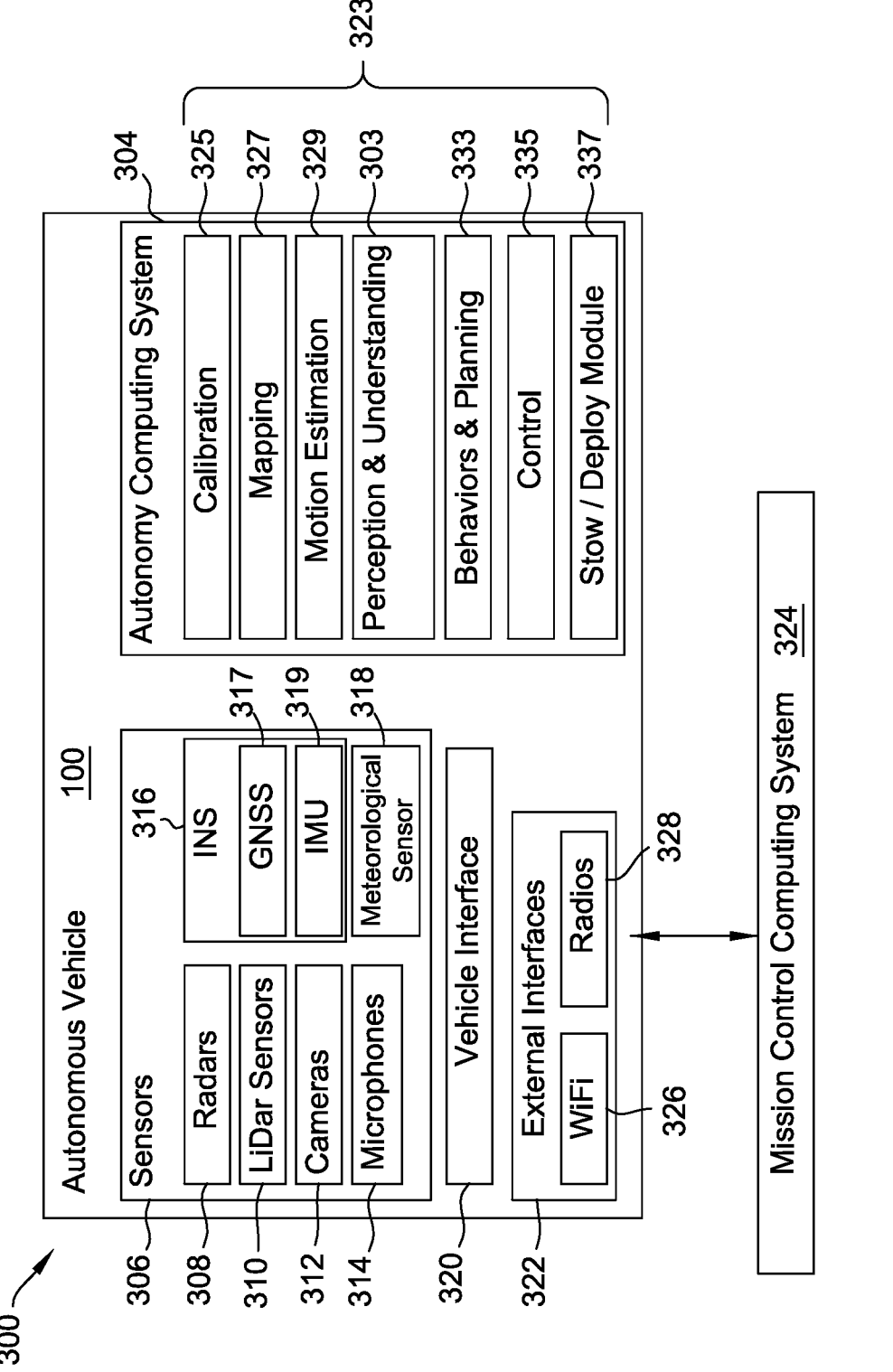
FIG. 3 is a block diagram of an autonomous driving system, including an autonomous vehicle that is communicatively coupled with a mission control computing system.

FIG. 3 is a block diagram of an autonomous driving system 300, used in combination with the autonomous vehicle 100 to control the operation of the vehicle. The driving system is communicatively coupled with a mission control computing system 324.

In some embodiments, the mission control computing system 324 may transmit control commands or data to the autonomous vehicle 100, navigation commands, and travel trajectories to the autonomous vehicle 100, and may receive telematics data from the autonomous vehicle 100 via an external interface.

In some embodiments, the autonomous vehicle 100 may further include sensors 306. Sensors 306 may include radio detection and ranging (RADAR) devices 308, light detection and ranging (LiDAR) sensors 310, cameras 312, and acoustic sensors 314. The sensors 306 may further include an inertial navigation system (INS) 316 configured to determine states such as the location, orientation, and velocity of the autonomous vehicle 100. The INS 316 may include at least one global navigation satellite system (GNSS) receiver 317 configured to provide positioning, navigation, and timing using satellites. The INS 316 may also include an inertial measurement unit (IMU) 319 configured to measure motion properties such as the angular velocity, linear acceleration, or orientation of the autonomous vehicle 100. The INS may include any number of IMUs and GNSS receivers. The sensors 306 may further include meteorological sensors 318. Meteorological sensors 318 may include temperature sensors, humidity sensors, anemometers, pitot tubes, barometers, precipitation sensors, or a combination thereof. The meteorological sensors 318 are used to acquire meteorological data, such as the humidity, atmospheric pressure, wind, or precipitation, of the ambient environment of autonomous vehicle 100. The data and information collected by the sensors 318 are communicated to the computing device and used to determine if a threshold ambient condition is present requiring the protective sleeve to be extended.

The autonomous vehicle 100 may further include a vehicle interface 320, which interfaces with an engine control unit (ECU) (not shown) or a MCU (not shown) of the autonomous vehicle 100 to control the operation of the autonomous vehicle 100 such as acceleration and steering.

The autonomous vehicle 100 may further include external interfaces 322 configured to communicate with external devices or systems such as another vehicle or mission control computing system 324. The external interfaces 322 may include Wi-Fi 326, other radios 328 such as Bluetooth, or other suitable wired or wireless transceivers such as cellular communication devices. Data detected by the sensors 306 may be transmitted to mission control computing system 324 via any of the external interfaces 322.

The autonomous vehicle 100 may further include an autonomy computing system 304. The autonomy computing system 304 may control driving of the autonomous vehicle 100 through the vehicle interface 320. The autonomy computing system 304 may operate the autonomous vehicle 100 to drive the autonomous vehicle from one location to another. In some embodiments, the autonomy computing system 304 may include modules 323 for performing various functions. Modules 323 may include a calibration module 325, a mapping module 327, a motion estimation module 329, perception and understanding module 303, behaviors and planning module 333, a control module 335, and a protection sleeve deploy/stow module 337. The deploy/stow module serves to selectively power the actuators that move the sleeve body of the protective sleeve 120 between deployed and stowed orientations. Modules 323 and submodules may be implemented in dedicated hardware such as, for example, an application specific integrated circuit (ASIC), field programmable gate array (FPGA), or microprocessor, or implemented as executable software modules, or firmware, written to memory and executed on one or more processors onboard the autonomous vehicle 100.

In some embodiments, based on the data collected from the sensors 306, including meteorological sensor 318, the autonomy computing system 304 and, more specifically, perception and understanding module 303 senses the ambient conditions and environment surrounding the autonomous vehicle 100 by gathering and interpreting sensor data. A perception and understanding module 303 interprets the sensed environment by identifying and classifying objects or groups of objects in the environment as well as the ambient environmental conditions surrounding the vehicle 100. For example, perception and understanding module 303 in combination with various sensors 306 (e.g., LiDAR, camera, RADAR, etc.) of the autonomous vehicle 100 may identify one or more objects (e.g., pedestrians, vehicles, debris, etc.) and environmental conditions along the roadway (e.g., rain, snow, hail) around autonomous vehicle 100, and classify the objects in the road and weather distinctly.

FIGS. 1A, 1B, 4A and 4B show exemplary protective sleeve 120 of the present disclosure. The frontal view of sleeve 120 and associated sleeve body may comprise any shape, such as an oval, rectangle, circle or other shape suitable to enclose sensing device 110 when deployed. When in the deployed orientation, the sleeve body serves as a barrier between the sensing device 110 and the environmental conditions. The sleeve may completely surround the sensing device or may partially surround the sensing device, such as in the form of a canopy that covers the sensor and has an open bottom portion. In the exemplary embodiment of the present disclosure, the protective sleeve 120 has a rectangular shape body that suitably surrounds the base of the sensing device 110. As shown in FIGS. 1A, 1B, 6A and 6B, the protective sleeve body comprises a substantially rectangular opening that enables sensing device 110 to collect data and information when the protective sleeve is deployed. Note that the protective sleeve may have any shape and peripheral configuration to suitably surround or partially surround associated sensing devices, e.g. LiDAR, camera, RADAR, etc. In the present exemplary embodiment of the present disclosure, the protective sleeve 120 includes a top wall 420, bottom wall 422 and sidewalls 424 that extend between the top and bottom walls 420 and 424. The bottom wall may be omitted in other exemplary embodiments. The side walls may be completely or partially omitted in other exemplary embodiments. The sleeve may comprise a unitary wall if a circular sleeve cross section is implemented, as described below in further exemplary embodiment. The top and bottom walls 420, 422 are substantially parallel and the right and left sidewalls 424 are parallel. The top, bottom and sidewalls collectively define a chamber 426. The sensing device 110 is located in the chamber when the sleeve 120 is deployed as shown in FIG. 4B and FIG. 6B. As also shown in FIG. 4B, 6B and FIGS. 1A and 1B, the top wall 420 has a greater magnitude length than the bottom wall 422. As a result of the difference in lengths the leading edge 428 of each sidewall is angled inwardly, toward sensor bar 108 as the edge extends from the top wall 420 to the bottom wall 422 to effectively connect the top and bottom walls. The inwardly angled wall and shorter bottom wall provide one possible mechanism for continued effective sensing by sensing device 110 when the sleeve body is deployed to ensure that the line of sight or perception of the sensing devices 110 is not blocked or otherwise impeded unnecessarily by the sleeve sidewall 424 or bottom wall 422. As indicated above, the sleeve body may be open along the bottom by removing the bottom wall, further limiting potential impediments to sensing device 110. In an alternate embodiment of the disclosure, the top wall 420 may be omitted such as when protecting the sensor from reflective glare from the vehicle.

In the exemplary embodiment of the present disclosure, the sensor bar includes a recess 430 that is configured to receive the stowed sleeve 120 as shown in FIG. 4A. When the sensing device is directly fastened to the vehicle cab, the recess may be formed directly in the cab. Alternatively, in another exemplary embodiment, the protective sleeve body may be collapsed/stowed along the outer surface of the cab and is not located in a recess when stowed. The sleeve 120 may be made from any material that enables the sleeve to provide the desired barrier between the sensing device 110 and undesirable ambient conditions. To that end, the protective sleeve should be made from a material that enables the sleeve to possess the desired rigidity and durability during use. The sleeve may be made from a metal, plastic or a suitably finished wood for example.

In the exemplary embodiment of the present disclosure, the actuator 400 may comprise an electric motor that drives a pair of cylindrical rollers 402. Although the rollers are disclosed in the exemplary disclosure, in an alternate embodiment, the sleeve body may be folded or collapsed by an actuator or the sleeve body may be hingeably connected to the cab and when deployed, unfold to provide an overhang to the sensing device 110. The rollers are provided in the recess 430. The rollers are in driving contact with the outer surfaces of the top and bottom walls. The rollers may be made of any material that contacts the top and bottoms walls and remains in contact with the protective sleeve body to deploy or stow the sleeve 120. The rollers 402 are driven by a motor 400 which may be a servomotor or any other suitable device to provide power to the rollers. The rollers rotate in opposite directions to deploy or stow the sleeve 120. For example, when it is necessary to deploy the sleeve body as a result of the presence of an undesirable ambient environmental condition, the upper roller contacting top wall 420 rotates in a clockwise direction and the lower roller contacting bottom wall 422 rotates in a counterclockwise direction. Conversely, when it is necessary to stow the sleeve body as a result of the absence of an undesirable ambient environmental condition, the upper roller contacting top wall 420 rotates in a counterclockwise direction and the lower roller contacting bottom wall 422 rotates in a clockwise direction. The actuator 400 energizes the rollers until the top and bottom walls reach their fully deployed or completely stowed orientations. A sensor or encoder, not shown may be located in the recess 430 or coupled to the actuator 400 and provide a signal to the actuator 400 to turn off the actuator when the displacement of the sleeve has been completed.

FIG. 5 is an exemplary flow diagram representing a method 500 of deploying and stowing the sleeve body of protective sleeve 120 of the present disclosure. In 502 of the method 500 a sensor such as meteorological sensor 318 collects data and information relating to the ambient environmental conditions surrounding the autonomous vehicle 100. The information collected by sensors 318 is processed by the controller. In 504 a determination is made if a threshold undesirable ambient environmental condition is present. The threshold undesirable environmental conditions may be stored in memory 204 of processing system 200. An exemplary undesirable environmental condition may comprise precipitation such as falling rain or snow. In 504 the processing system 200 processes the data from sensors 318 to determine if the data reflects the presence of an undesirable environmental condition. Additionally, the stow/deploy module 337 may access other data that reflects approaching environmental weather patterns, such as rain that is occurring in the distance and not proximate the vehicle 100. If an undesirable environmental condition is present or approaching the vehicle 100, in 508, the processing system using data collected by the stow/deploy module sends a signal to power actuator 400 and in turn activate the rollers 402 to thereby deploy the sleeve body of protective sleeve 120. In 510 the sensors 318 continue to sense and process environment-related data and information. In 512, when there is an absence of an undesirable environmental condition and the sleeve body is deployed, a signal is sent to the actuator 400 and the actuator in turn causes the members 402 to rotate in an opposite direction to thereby stow the sleeve body. The sleeve body remains stowed until another undesirable environmental condition is sensed. As a result of the present embodiment, the operation of sensing devices mounted on the vehicle 100 is less likely to be negatively impacted by undesirable environmental conditions. In some embodiments, environmental sensor 318 may be sensing device 110. In such an embodiment, the determination of undesirable environmental condition may be performed by monitoring the data stream of sensor 110 directly, for example, assessing if rain is visible in a camera image.

Figure 7A:
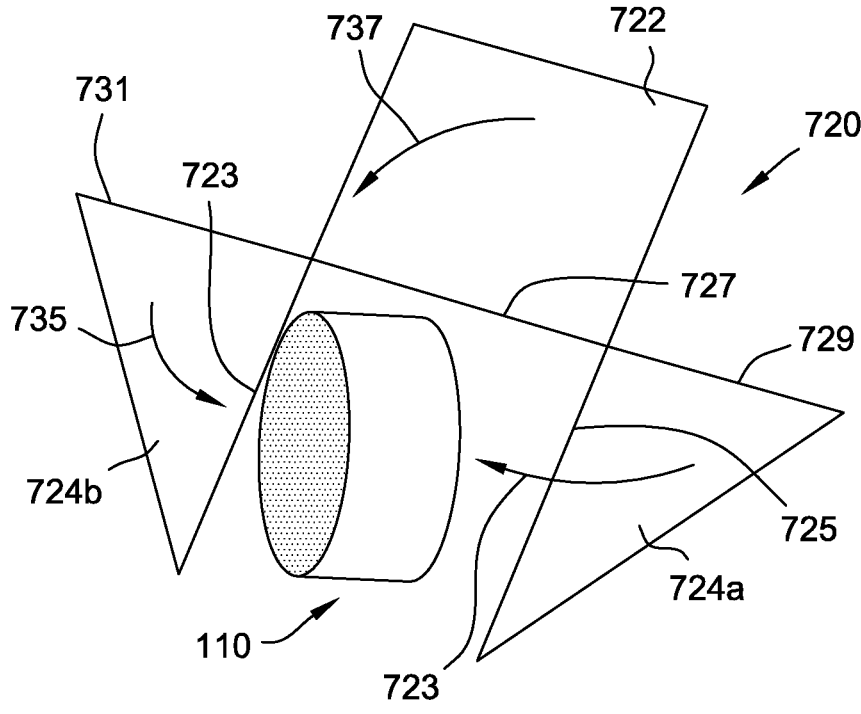
FIG. 7A is an alternate embodiment protective sleeve with the alternate embodiment protective sleeve body in the stowed orientation.
Figure 7B:
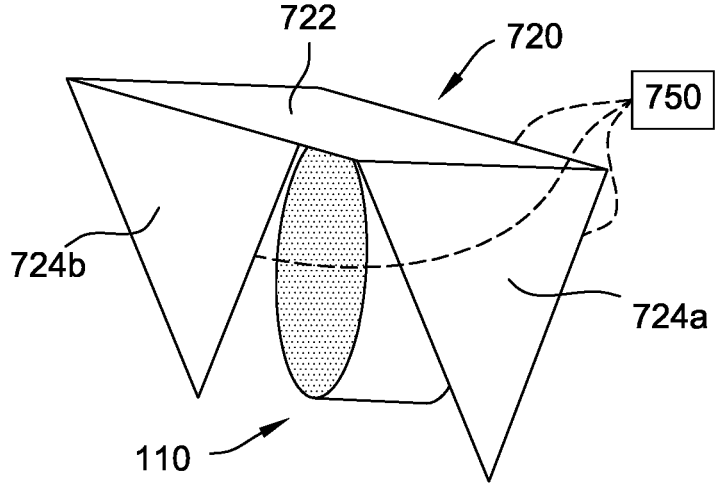
FIG. 7B is the alternate embodiment protective sleeve of FIG. 7A with the alternate embodiment protective sleeve body in the deployed orientation.

An alternate embodiment protective sleeve 720 of the present disclosure is shown in FIGS. 7A and 7B. The sleeve body of the protective sleeve 720 is shown in the stowed orientation in FIG. 7A and the sleeve body of the protective sleeve 720 is shown in the deployed orientation in FIG. 7B. The sleeve body of protective sleeve 720 is comprised of flaps 722, and 724. The sleeve 720 comprises two side flaps 724a, 724b and one top flap 722. The side flaps and top flap may be hingeably connected to an actuator 750 such as a servo motor, hydraulic system or pneumatic system to selectively move the flaps between deployed and stowed orientations. The protective sleeve 720 includes the processing system 200, sensor 318, stow/deploy module 337 function as previously described with respect to protection sleeve 120, and during use communicates with the processing system, sensor and stow/deploy module to move the protective sleeve 720 between the stowed orientation and deployed orientation when an undesirable environmental condition is proximate the vehicle 100.

Side flap 724 a comprises a hinge edge 725 and top edge 729. Side flap 724b comprises a hinge edge 723 and a top edge 731. Top flap 722 includes a hinge edge 727. When an undesirable environmental condition is sensed, the flaps 724a, 724b and 722 are caused to rotate about their respective hinge edges toward the other flaps and sensing device 10. As shown in FIG. 7A, side flap 724a rotates in direction of arrow 733, side flap 724b rotates in direction of arrow 735 and flap 727 rotates in direction of arrow 737. When rotation of the flaps is complete the top flap rests on the edges 731, 729 of respective flaps 724b and 724a. The sleeve body of protective sleeve 720 forms a barrier between environmental conditions and sensing device 110. When the environmental condition is no longer present, the actuator rotate the flaps away from the sensing device. The flaps may be directly attached to the cab of the autonomous vehicle 100.

Figure 8A:
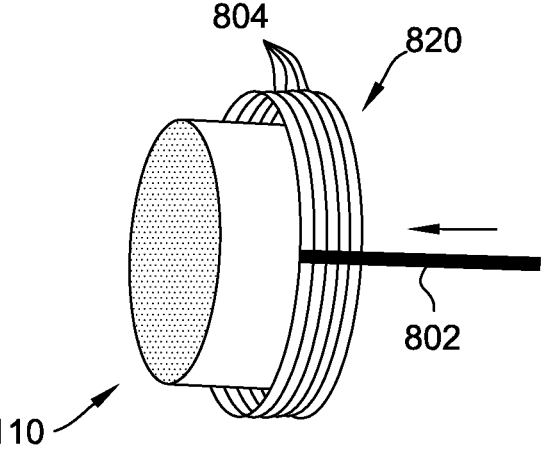
FIG. 8A is a further alternate embodiment protective sleeve with the further alternate embodiment protective sleeve body in the stowed orientation.
Figure 8B:
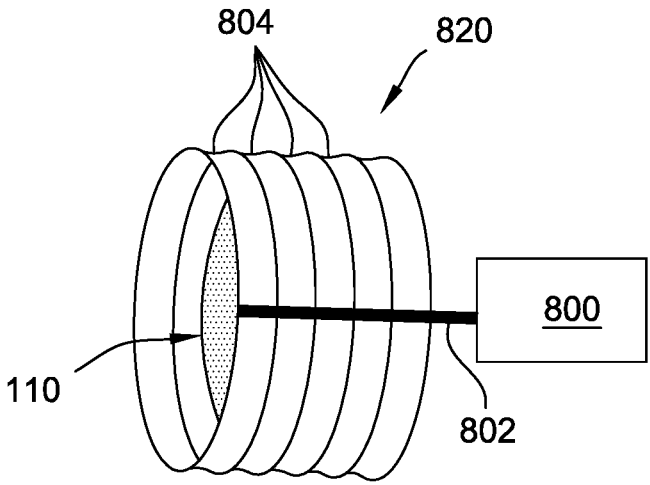
FIG. 8B is the further alternate embodiment protective sleeve of FIG. 8A with the further alternate embodiment protective sleeve body in the deployed orientation.

A further alternate embodiment protective sleeve 820 of the present disclosure is shown in FIGS. 8A and 8B. The sleeve body of the protective sleeve 820 is shown in the stowed orientation in FIG. 7A and the sleeve body is shown in the deployed orientation in FIG. 8B. The protective sleeve 820 comprises a cylindrical accordion bellows structure that comprises a plurality of collapsible and expandable annular sections 804. The protective sleeve comprises a cylindrical sleeve body with a circular opening 803 through which the sensing device is able to collect data and information when the protective sleeve is deployed. As shown in the deployed orientation of FIG. 8B, the protective sleeve encloses the sensing device 110 to provide a barrier between the undesirable environmental conditions and the sensing device. In an alternate embodiment, the sleeve body of protective sleeve 820 may be arcuate and not completely surround the sensing device 110. In such an alternate exemplary embodiment, sleeve 820 still effectively serve as a barrier between environmental conditions and the sensing device 110. The bellows 804 is connected to an actuator 802. The actuator may comprise a rod that is displaced by a servo motor/worm gear combination, vibration motor, or pneumatic or hydraulic system. Although one rod is shown in FIGS. 8A and 8B, it should be understood that a plurality of rods may be connected to the protective sleeve 820 and used to selectively move the bellows 804 between the stowed and deployed orientations. When the bellows 804 are in the stowed orientation, the bellows may be located in a recess that surrounds the sensing device 110 like recess 430 previously described. Alternatively, the stowed bellows may be collapsed along the exterior of the vehicle 100. When an undesirable environmental condition is sensed, the actuator 802 is extended and the protective sleeve 820 is moved to the deployed orientation shown in FIG. 8B. The processing system 200, sensors 318, stow/deploy module 337 function as previously described with respect to protection sleeve 120 to move the protective sleeve 820 from the stowed orientation to the deployed orientation when an undesirable environmental condition is proximate the vehicle 100.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processors, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms such as processor, processing device, and related terms.

In the embodiments described herein, memory may include, but is not limited to, a non-transitory computer-readable medium, such as flash memory, a random-access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims

What is claimed is:

1. A protective sleeve to provide a barrier between an undesirable environmental condition and a sensing device; the protective sleeve comprising: a sleeve body; the sleeve body being movable between a stowed orientation and a deployed orientation, when in the deployed orientation the sleeve providing a barrier between the environmental condition and the sensing device; the sleeve body being movable between the stowed and deployed orientations by an actuator, the protective sleeve further comprising a processing system including a sensor for sensing the environmental conditions proximate the sensor, the processing system programmed to selectively power the actuator when an undesirable environmental condition is sensed by the sensor to move the sleeve body to the deployed orientation, and also selectively power the actuator to cause the actuator to move the sleeve body to the stowed orientation in the absence of an undesirable environmental condition.

2. The protective sleeve as claimed in claim 1, wherein the sleeve body is cylindrical.

3. The protective sleeve as claimed in claim 1, wherein the actuator comprises at least one rod fixed to the sleeve body.

4. The protective sleeve as claimed in claim 1, wherein the sleeve body is rectangular.

5. The protective sleeve as claimed in claim 1, wherein the actuator is comprised of at least one roller that contacts the sleeve body to move the sleeve between the stowed and deployed orientations.

6. The protective sleeve as claimed in claim 1, wherein the sleeve body is comprised of a plurality of flaps, each flap being movable toward and away from the other flaps.

7. An autonomous vehicle comprising; a sensing device; a protective sleeve located along the periphery of the of the sensing device, the protective sleeve being movable between a stowed orientation and a deployed orientation where the sleeve surrounds the sensing device, the protective sleeve being movable between the stowed and deployed orientations by an actuator, the autonomous vehicle further comprising a processing system including a sensor for sensing the environmental conditions proximate the autonomous of the vehicle, the processing system programmed to selectively power the actuator when an undesirable environmental condition is sensed by the sensor to move the protective sleeve to the deployed orientation, and also selectively power the actuator to cause the actuator to move the protective sleeve to the stowed orientation in the absence of an undesirable environmental condition.

8. The autonomous vehicle as claimed in claim 7, wherein the protective sleeve has a rectangular sensing opening when the protective sleeve is in the deployed orientation.

9. The autonomous vehicle as claimed in claim 7, wherein the protective sleeve comprises a top wall, a bottom wall and sidewalls extending between the top and bottom walls, the side walls having a leading edge that is inwardly tapered from the top wall to the bottom wall.

10. The autonomous vehicle as claimed in claim 9, wherein the top wall has a greater magnitude length than the bottom wall.

11. The autonomous vehicle of claim 7, wherein the actuator comprises a motor and at least at least one movable member, the at least one movable member comprises a roller.

12. The autonomous vehicle as claimed in claim 11, wherein the at least one movable member comprises two rollers, one of the rollers contacting the top wall and one of the rollers contacting the bottom wall.

13. The autonomous vehicle as claimed in claim 7, wherein the protective sleeve has a circular sleeve opening and a cylindrical body.

14. The autonomous vehicle as claimed in claim 7, wherein the protective sleeve is comprised of an accordion bellows.

15. The autonomous vehicle as claimed in claim 7, wherein the actuator comprises at least one rod.

16. The autonomous vehicle as claimed in claim 15, wherein the at least one rod comprises a plurality of rods.

17. A method for stowing and deploying a protective sleeve located along the periphery of a sensing device mounted along an autonomous vehicle, the protective sleeve being deployed and stowed by an actuator selectively powered by a processing system, the processing system including a sensor, the method comprising: processing sensor data and information collected by the sensor, the data and information relating to environmental conditions proximate the autonomous vehicle; determining if a threshold undesirable environmental condition is present; and if an undesirable environmental is present, powering the actuator to cause the protective sleeve to move to the deployed orientation and thereby surround the sensing device.

18. The method of claim 17, further comprising after the protective sleeve has been deployed, the sensor continuing to sense and process environmental related data and information.

19. The method of claim 17, further comprising accessing data and information that reflects approaching environmental patterns that are not proximate the autonomous vehicle.

20. The method of claim 17, wherein the threshold undesirable environmental conditions are stored in a processor of the processing system, the method comprising accessing the stored undesirable environmental conditions.

\* \* \* \* \*